United States Patent
Toh

(10) Patent No.: US 6,346,965 B1
(45) Date of Patent: *Feb. 12, 2002

(54) HIGH RESOLUTION IMAGING SYSTEM FOR SIMULTANEOUS ACQUISITION OF TWO HIGH ASPECT RATIO OBJECT FIELDS

(75) Inventor: Peng Seng Toh, Parc Oasis (SG)

(73) Assignee: Agilent Technologies, INC, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/994,609

(22) Filed: Dec. 19, 1997

(51) Int. Cl.$^7$ ................................................ H04N 13/02
(52) U.S. Cl. ............................ 348/49; 348/47; 348/36; 348/218
(58) Field of Search ........................... 348/36, 47, 218, 348/79, 195, 202, 219, 42, 49, 54, 148

(56) References Cited

U.S. PATENT DOCUMENTS

| | | | | | |
|---|---|---|---|---|---|
| 4,589,030 A | * | 5/1986 | Kley | ........................... | 348/218 |
| 5,073,888 A | * | 12/1991 | Takahashi et al. | ........... | 369/109 |
| 5,663,761 A | * | 9/1997 | Fukui | ........................... | 348/323 |
| 5,668,596 A | * | 9/1997 | Katayama et al. | ........... | 348/218 |
| 5,706,387 A | * | 1/1998 | Makishima | .................. | 348/220 |
| 5,798,791 A | * | 8/1998 | Katayama et al. | ........... | 348/218 |
| 5,903,303 A | * | 5/1999 | Fukushima et al. | ........... | 348/47 |
| 5,926,218 A | * | 7/1999 | Smith | ........................... | 348/358 |

* cited by examiner

*Primary Examiner*—Wendy R. Garber
*Assistant Examiner*—Mitchell White

(57) ABSTRACT

A high resolution imaging system for capturing a pair of object fields at extended resolution. The system has a twin input acquisition optical group, an image parting mechanism and a beam reception group where each module works to part and relay images of two object fields. The relayed images are segmented and directed to two image detector systems to extend the acquisition resolution. Electronic processing is used to merge and process the two image detector signals simultaneously. The resolution of the image detector is extended to produce high finesse qualities for high aspect ratio object fields.

10 Claims, 4 Drawing Sheets

HIGH RESOLUTION IMAGING SYSTEM FOR SIMULTANEOUS ACQUISITION OF TWO HIGH ASPECT RATIO OBJECT FIELDS

BACKGROUND OF THE INVENTION

The present invention generally relates to a system and method for imaging and more particularly to imaging multiple images.

Classical techniques of image capturing systems consists of optical elements arranged to collect light signals from an object. The light signals are processed and focused to form a single image of the entire object at the focal plane where a detector system is placed. The detector system are typically pixelated Charge Coupled Device (CCD) cameras. The detector systems are transmitted electronically to a display system in direct synchronization with the detector system.

The operation of this classical imaging system works to capture the entire scene of an object field, generally with an aspect ratio near 1.0:1 to 1.5:1. Standard television aspect ratio is 4:3 or 1.33:1. The limitation on the implementation of such a classical imaging capturing system on a large object field with high aspect ratio leads to a loss of descriptive image signal details on the object. Traditionally, to overcome the loss of image signal detail, a reduced object field is used as a compromise.

In addition, the classical imaging system captures one entire object field and displays in a single image field and displays as a single image frame. To capture two object fields, the process is repeated in a sequential manner, with the two object fields being displayed sequentially or overlapped or stored separately.

The prior art is distinctive in its resolution limits and sequential capture of multiple object fields. The approach to increase resolution is to increase pixelation densities. However, there are practical limits in fabrication and production of very high pixel density CCD cameras. There is presently an urgent need for an imaging system with higher resolution than what is currently available.

SUMMARY OF THE INVENTION

In one aspect, the present invention provide an imaging and processing system that is capable of capturing simultaneously two high finesse object fields with high aspect ratios to processing them in a single image frame. The capability to acquire more than one object field in a single frame will reduce date storage requirements and time required to process and enhance the acquired images.

The present invention also provides an imaging and processing system using two currently readily available CCD image detectors with pixel densities such as M×N matrix in the system resulting in resolution performance increased two fold for an elongated object field (2M×N).

Furthermore, according to the present invention, an imaging acquisition system can be modular and versatile. Systems according to the invention can be assembled from regular modules for various applications and object fields.

Still further, imaging acquisition systems according to the present invention can be made to acquire high aspect ratio objects fields in contrast to currently available systems.

Also, the imaging and processing systems according to the present invention can be used to perform under lighting condition available for imaging processing and machine applications.

To this end, the present invention provides systems and methods applying innovative assembly of image acquisition optics, critical detector system arrangements and display methods.

An an embodiment of the image acquisition optics according to this invention, the optics includes a front twin optical system and prisms arranged for the relay and folding of light beams into a common beam reception group. The front twin optical group allows for acquiring two object fields simultaneously. Each of the twin optical group collects light signals from the object fields to which it is directed. The light received by the optics from the two object fields are processed optically by an image parting technique to reach a detector system plane side by side. In this manner, two high aspect ratio object fields can be displayed side by side on a single frame. The axes of the front twin optical systems are constructed to be movable or hinged for flexible orientation of the viewing directions. Additional optical elements can be mounted to enhance these capabilities.

Also, a separate optical technique is used for the critical arrangement of detector systems to generate increased resolution. This is achieved by the segmentation of individual object fields and directing the light beams into two detector arrays that are arranged in an ordered offset according to the segmentation. In this way, two ordinary detector systems with a given available pixelation density for example, M×N can so be arranged to capture an object field. The resulting resolution is increased to about 2M×N for that object field.

An electronics processor interface for the system can be used to merge the two detector data signals into one single image frame. The final resultant display of the image frame is in the form of elongated picture configuration.

The modular construction is achieved by optimizing and encapsulating the optics and reflecting elements in a mechanical system suitable for versatile interchangeability and connections such as slider mechanism (e.g., that which is described in the preferred embodiments). The system can be assembled for the acquisition of a single object field at high finesse details when constructed with a single front optical group. A separate system constructed with a twin front imager group can be used to view a pair of rows of leads from an integrated circuit (IC) package. The twin front imager group can be constructed to adjust to suit the distance between the rows of leads, or to view them at different orientations.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

Figure 1:
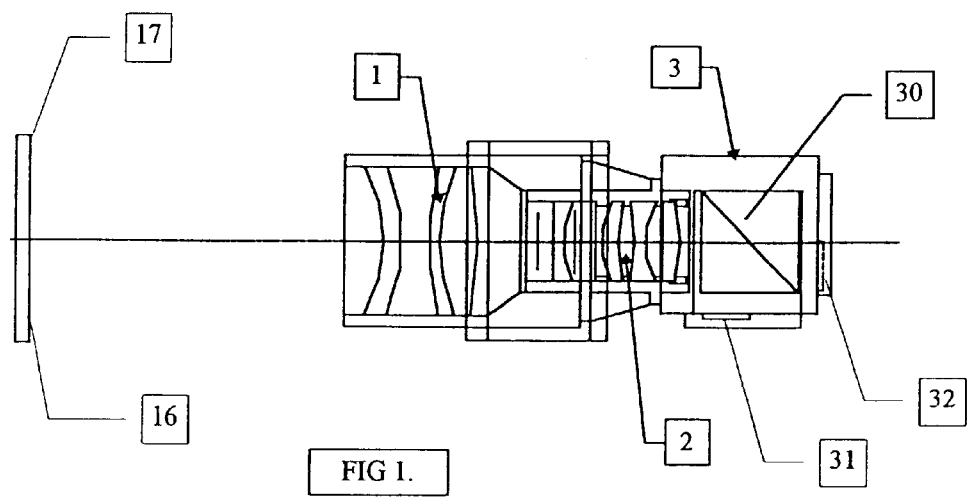
FIG. 1 illustrates a side view of an embodiment of the imaging system.

FIG. 1 shows an imaging and display system according to the present invention. In this embodiment imaging and display system simultaneously captures two high finesse, high aspect ratio objects that are displayed in a single frame. As shown in FIG. 1, the imaging system has three main image acquisition optical modules and an electronic module. The image acquisition optical modules are a front twin optical module 1, image parting module 2, and a beam reception module 3. The modules are constructed with mechanical design interfaces that allow capability for modular assembly.

Twin Imaging Mechanism

Figure 2:
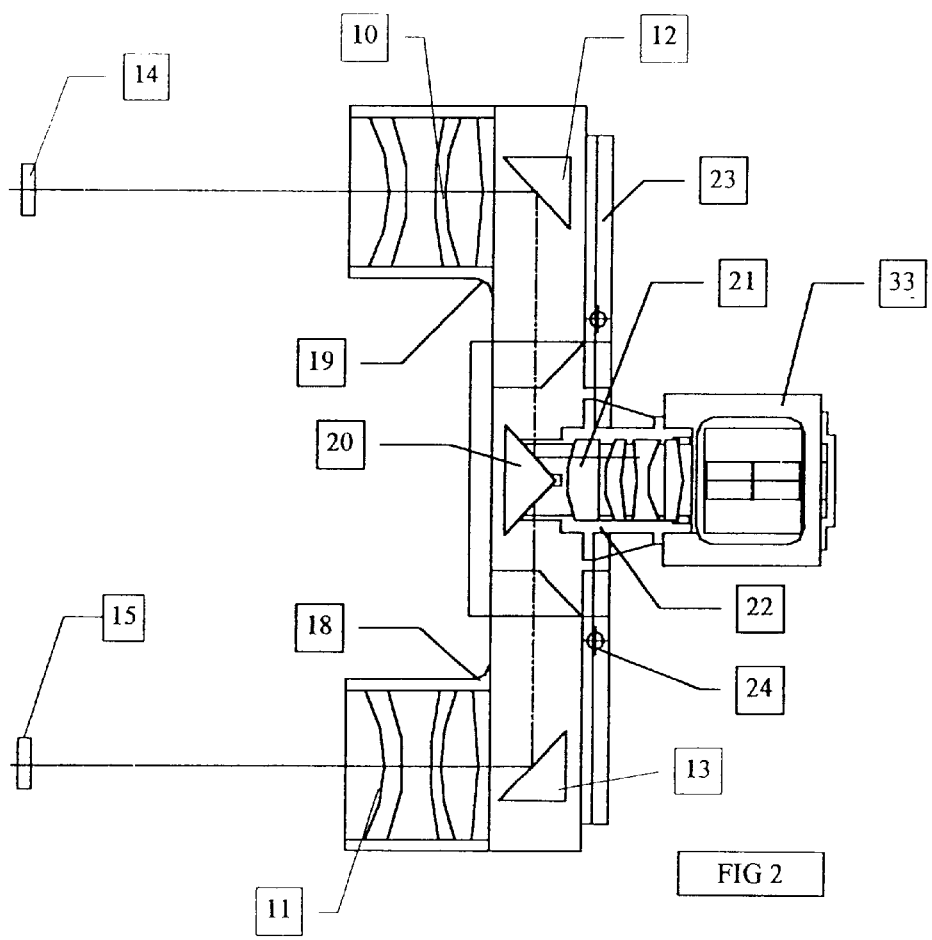
FIG. 2 illustrates a front elevation of an embodiment of the device arranged to acquire two object fields.

In the embodiment shown in FIG. 2, the front twin optical module 1 contains optical elements 10, 11 constructed to work with prisms 12, 13 to relay light beams from elongated objects 14, 15 respectively. These optics and/or other suitable optical components are so arranged for the relay of the elongated objects 14, 15 positioned in the same orientation as the prisms 12, 13. The size of the objects 14, 15 are extended in shape stretching from 16 to 17. The optical components are housed in two separate cells 18, 19.

The image parting module 2 includes a mirror prism 20 and lenses 21 which are assembled in cell 22 (see FIG. 2). The mirror prism 20 parts the images of 14, 15. The image parting module 2 and the front twin optical module 1 are assembled at the mirror prism 20 optical axis interface.

Cells 18, 19 are interfaced to cell 22 on a sliding mechanism 23 for adjusting the object positional distances between 14, 15. The relative positions of these two cells can be fixed with locking mechanism 24. This or other similar arrangements allows the sliding mechanism to adjust the inter-axial distance to view objects positioned differently. This construction enables the simultaneous paired image acquisition of the object 14, 15. The objects 14, 15 will be imaged side-by-side at the detector system placed at the focal imaging plane.

Extended Pixelation Resolution Mechanism

As seen in the embodiment of FIG. 1, the beam reception module 3 includes of a beam splitter 30 and two CCD image detectors 31&32 assembled in a cell 33 to form a module. The beam splitter 30 is arranged to divide the light beam coming from the elongated object field, say 16 to 17 through the front twin optical module 1, and image parting module 2. The light beam is divided such that CCD detector 31 captures the first image segment 16 of the object field and CCD detector 32 captures the second segment 17 of the object field. In this manner, each object field length separated into two segments and the whole extended field is detected by the sum of number of pixels provided by the CCD image detectors 31, 32.

Image Merging by Electronics Integration

Figure 3:
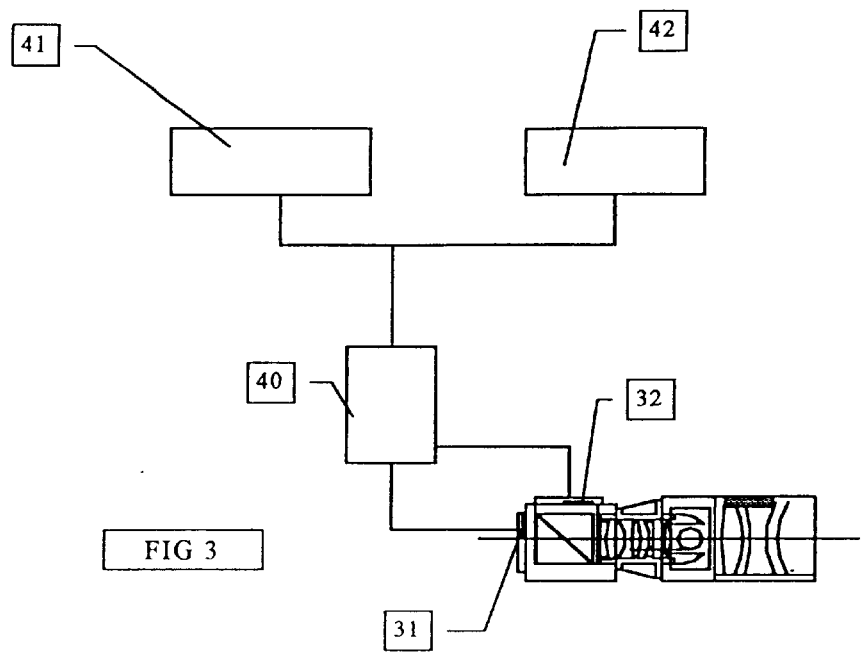
FIG. 3 illustrates an embodiment of the image electronic integration system for two CCD image detector chips.

As shown in FIG. 3, the electronic module includes of three parts. The first part is the image integrator 40 receives and digitizes the output signals from the two CCD image detectors 31, 32 and then merges the two segments of object fields 16, 17 to reconstruct an image of the extended objects again in a single frame displayed on a monitor 41. The digital image processor 42 is used to further process the captured images to detect high finesse features of the object fields for further enhancements or calculations. A much higher final resolution can be achieved by the processor 42 by performing pixel interpolation calculations.

Figure 4:
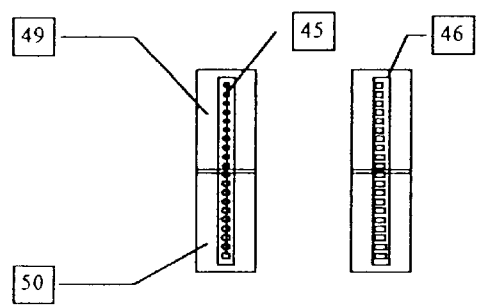
FIG. 4 illustrates an embodiment of the object field segmentation and display.
Figure 4:
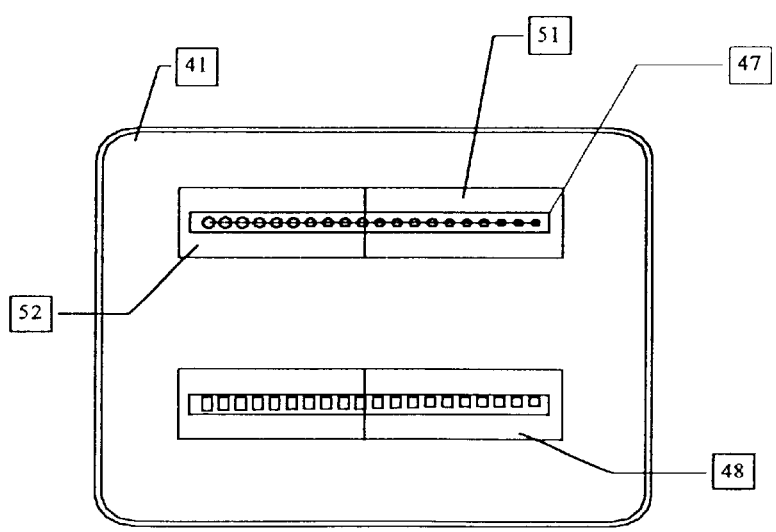

The final result executed by the imaging system is illustrated by viewing of two objects 45, 46 see FIG. 4A). The objects are acquired by the front twin optical module 1 of the imager system and displayed on the monitor screen 41 as images 47, 48 respectively (see FIG. 4B). An elongated object 45 having rows of circles is segmented by the beam reception module 3 into segments tagged 49 to 50. These segments are directed by the beam reception module to two CCD image detectors 31, 32 described previously. The images received by the detectors are processed by the electronic module to form a single image frame for ease of data processing.

Macro-Super Resolution Imager

Figure 5A:
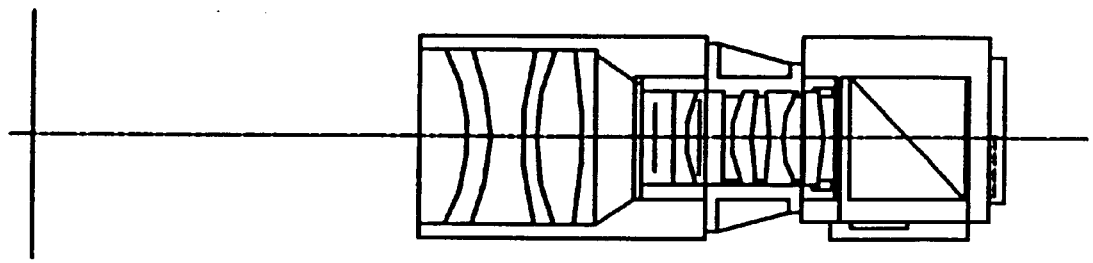
FIGS. 5a, 5b and 5c illustrates various configurations of the device assembled for viewing of high finesse object.

The basic configuration for a single object field is illustrated in FIG. 5a, containing a single optical unit and the beam reception unit. The image is acquired at enhanced pixel resolution and large aspect ratio, as compared to a normal camera system in a way similar to what has been described for FIG. 1.

Figure 5B:
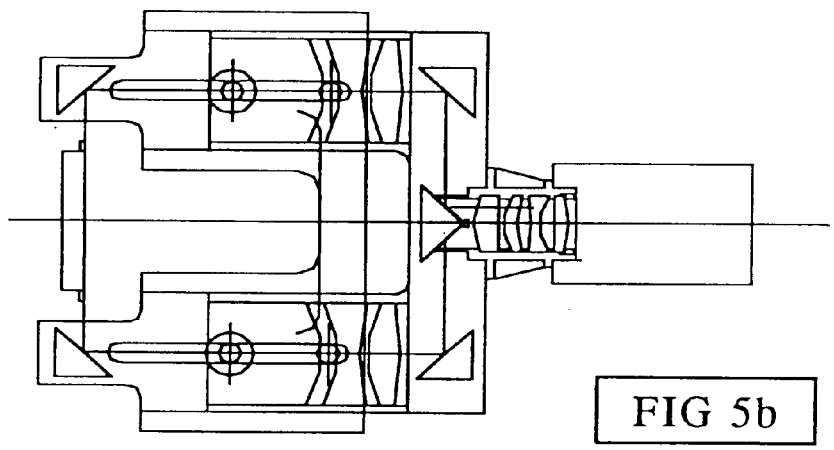
Figure 5C:
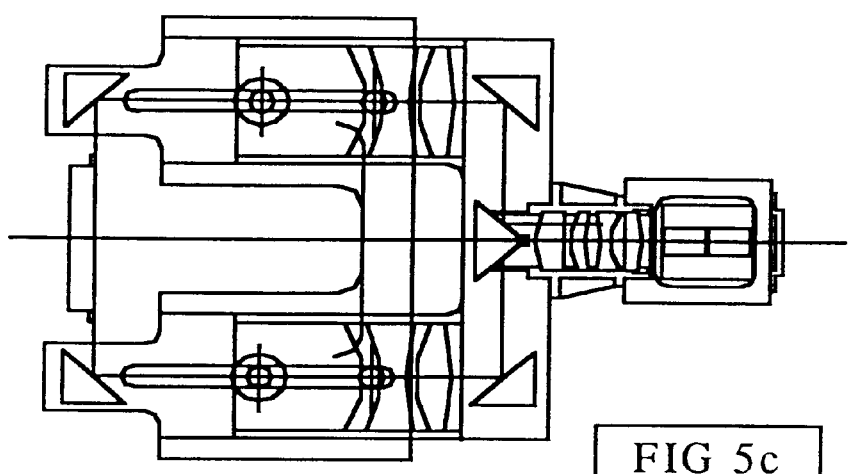

In FIG. 5b, by constructing the front twin optical units on a image parting module, the device can be used for viewing objects at very close range. This device configuration forms a dual view macro-imager application. The optical units can be adjusted for inter-axis shifts and directions suitable for acquiring the images of the target objects. A single ordinary camera can be attached. This is an improvement over conventional capture of the entire scene encompassing the two objects. In FIG. 5c, another configuration is disclosed by the coupling of the two CCD detector beam reception module. In this configuration, the acquired pixel resolution is further enhanced and the object aspect ration can be vastly increased.

IC Inspection Head System

Modern electronic integrated circuit (IC) chip components are packaged with high pin-count and high density leads. It is a common requirement to inspect the leads before the IC packages are assembled onto printed circuit boards (PCB). There are a few inspection processes required to be performed such as the component information printed on the IC package, the coplanarity of the lead, lead dimensions, etc. The fabrication and manufacture of these packages follow a general trend of increased lead density and lead count.

Currently, for a large IC package, capturing the entire component in a single view frame using ordinary cameras is not able to generate the pixel resolution essential for advanced image processing work such as full dimensional extension of the component. Various partial and reduced object field techniques are used for the inspection of the IC.

The device assembled in the single object field with CCD image detector beam reception module configuration can be used to view the entire package. The resulting image will generate enhanced acquired pixel resolution which is sufficient to measure the full lead extensions accurately.

Figure 6:
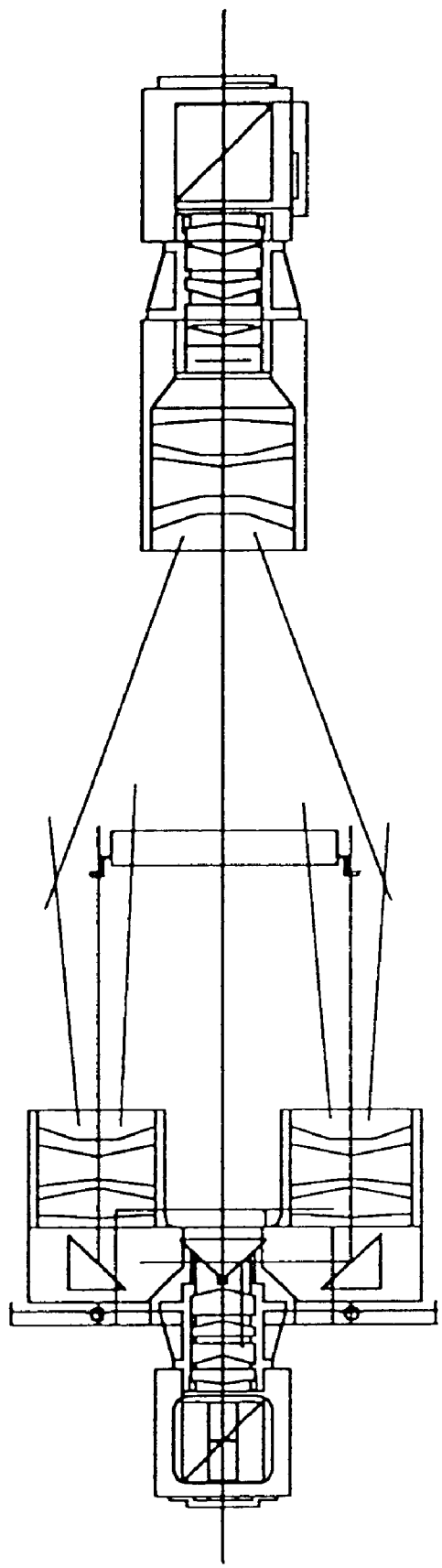
FIG. 6 illustrates an embodiment of an arrangement for the inspection of IC package.

To inspect the lead end for defects, the fully constructed imager comprising of front twin optical unit, image parting unit and CCD image detector beam reception unit can be used. The pair of front optical units is directed at the rows of leads endwards or from the plan. The acquired pixel resolution is high and sufficient to detect defects such as coplanarity and lead tilts. The illustration for a fully equipped package inspection device is illustrated in FIG. 6.

Comparative Measurement Devices

Real time multiple object calibration or comparative viewing can be performed by the device. As an example, two objects may be studied for characteristic changes simultaneously or a stable calibration tool or ruler can be placed in the second object field. The object to be studied is placed in the study partition and the measuring device or ruler is placed in a stable environment. According to the studies required, as the ambient condition changes at the first object field, changes can be observed in real time.

It should be understood that various changes and modifications to the presently preferred embodiments described herein will be apparent to those skilled in the art. Such changes and modifications may be made without departing from the spirit and scope of the present invention and without diminishing its attendant advantages, It is, therefore, intended that such changes and modifications be covered by the appended claims.

What is claimed is:

1. An apparatus for simultaneously imaging two fields of an object, comprising:

a first optical module oriented to receive an image of a first field of the object, the first optical module comprising an optical element for projecting the image of the first field, a second optical module oriented to receive an image of a second field of the object, the second optical module comprising an optical element for projecting the image of the second field, an image combining module oriented to receive the projected images of the first and second fields, the image combining module comprising a detector system and an optical element that simultaneously projects the image of the first field and the image of the second field side-by-side onto a plane of the detector system.

2. An apparatus as claimed in claim 1, wherein the image of the first field and the image of the second field projected onto the plane of the detector system each have an aspect ratio, and the area occupied by the images of the first and second fields projected side-by-side has an aspect ratio smaller that the aspect ratio of the first or second fields.

3. Apparatus as in claim 1 wherein the optical element of the first optical module comprises a reflector.

4. Apparatus as in claim 1 wherein the optical element of the image combining module comprises a mirror prism.

5. An apparatus as claimed in claim 1, wherein the image combining module additionally comprises a lens that simultaneously focuses the image of the first field and the image of the second field onto the plane of the detector system.

6. An apparatus as claimed in claim 1, wherein the detector system includes two detector arrays.

7. An apparatus as claimed in claim 6, wherein each of detector arrays includes a charge coupled device (CCD).

8. An apparatus as in claim 6, wherein the detector system additionally comprises a beam splitter arranged to divide the side-by-side images of the first and second fields such that one of the detector arrays captures first segments of the images and the other of the detector arrays captures second segments of the images.

9. An apparatus as in claim 1, wherein the detector system includes no more than one camera.

10. A method for simultaneously imaging two fields of an object, comprising:

receiving an image of a first field of the object and projecting the image of the first field along a first optical axis, receiving an image of a second field of the object and projecting the image of the second field along a second optical axis, and projecting the images of the first and second fields from the first and second optical axes along a third optical axis such that the two images are projected side-by-side.

* * * * *